Figure 1:
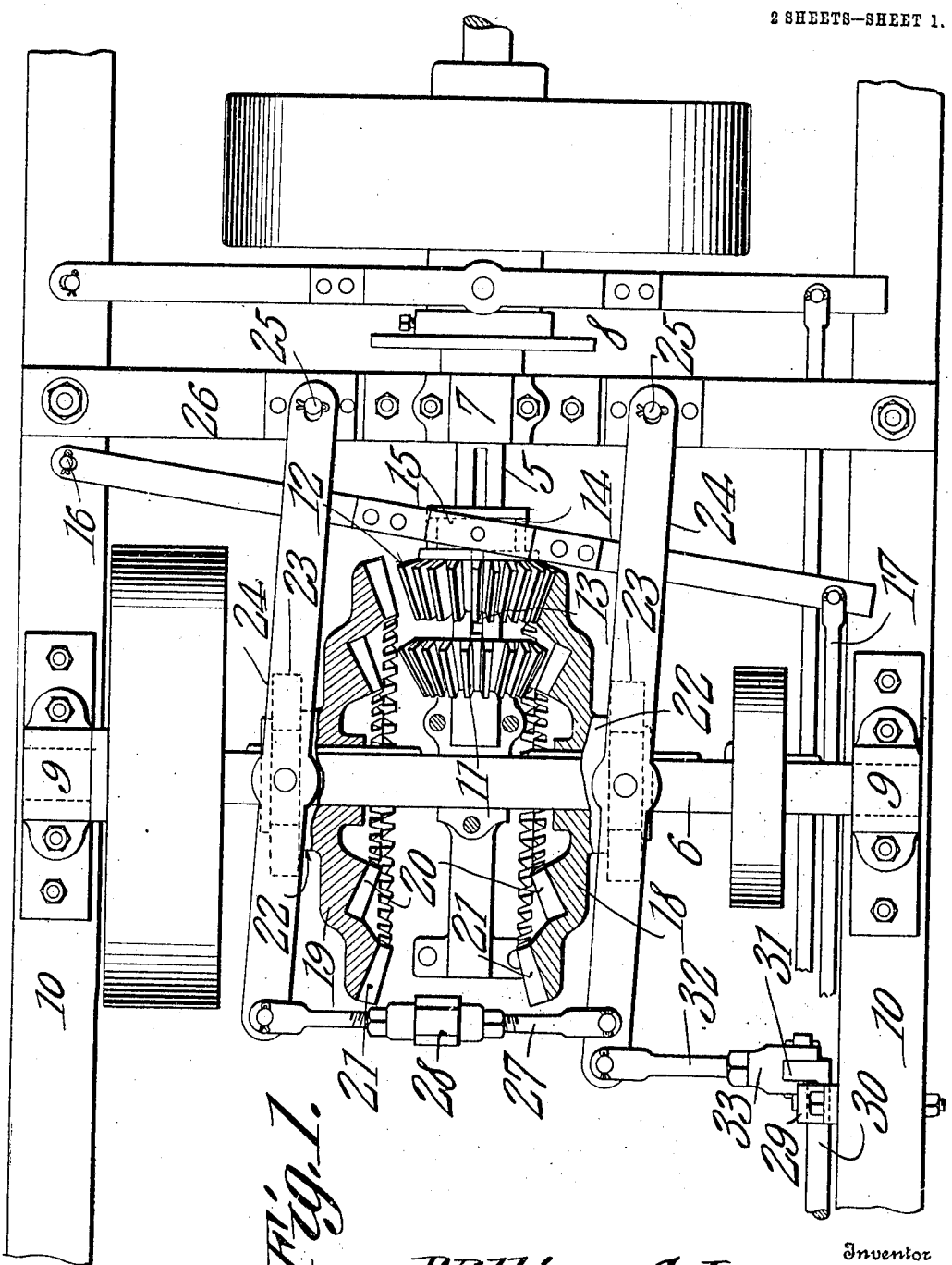

W. C. JAMESON.
TRANSMISSION MECHANISM.
APPLICATION FILED OCT. 7, 1909.

947,386.

Patented Jan. 25, 1910.
2 SHEETS—SHEET 1.

Witnesses

Inventor
William C. Jameson.
By C. A. Snow & Co.
Attorneys

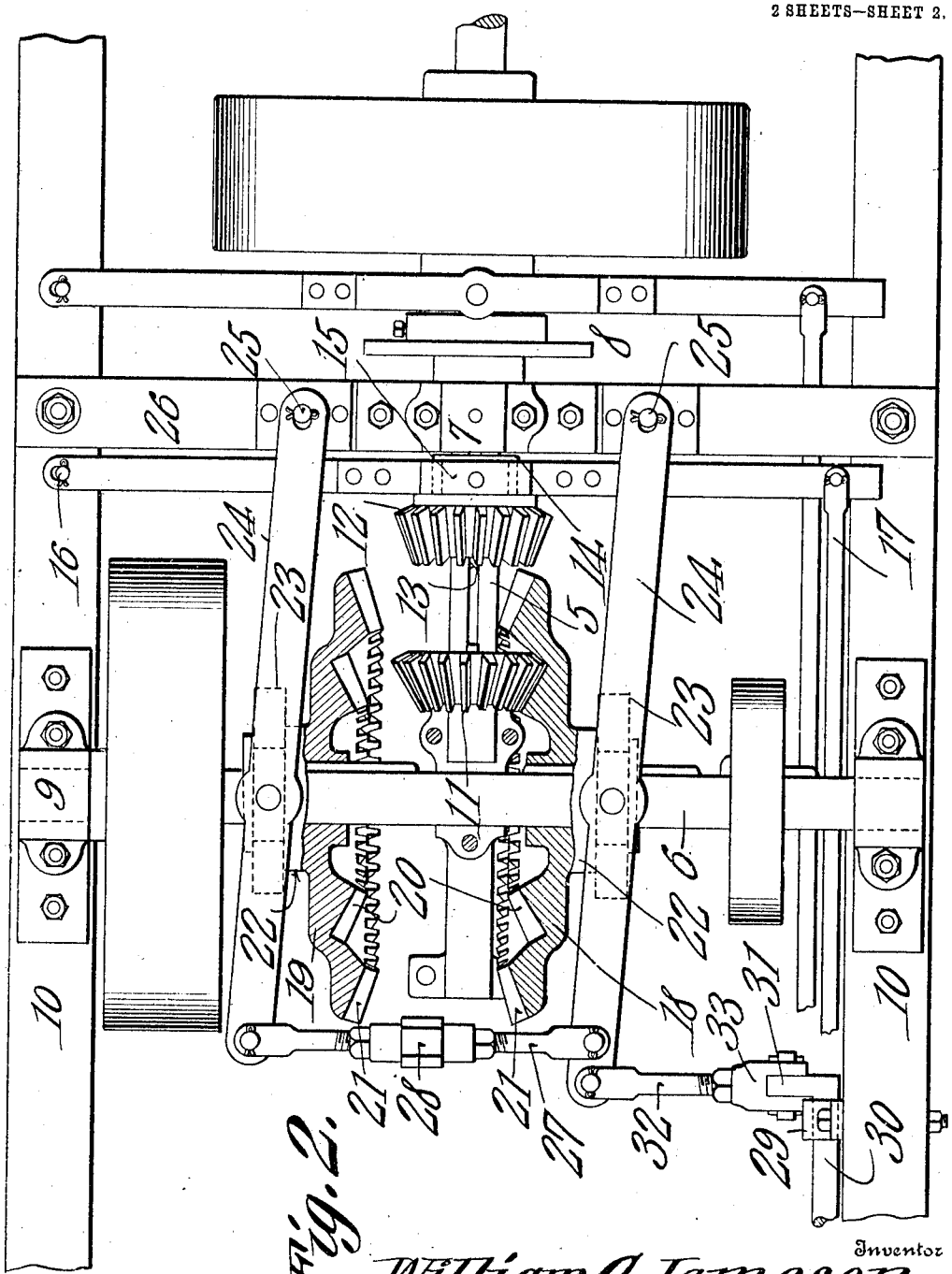

UNITED STATES PATENT OFFICE.

WILLIAM C. JAMESON, OF COLEMAN, TEXAS.

TRANSMISSION MECHANISM.

947,386.   Specification of Letters Patent.   Patented Jan. 25, 1910.

Application filed October 7, 1909. Serial No. 521,478.

*To all whom it may concern:*

Be it known that I, WILLIAM C. JAMESON, a citizen of the United States, residing at Coleman, in the county of Coleman and State of Texas, have invented a new and useful Transmission Mechanism, of which the following is a specification.

This invention has for its object to provide an improved mechanism by which the motion of a drive shaft rotating at a uniform speed may be transmitted to a driven shaft at variable speeds, and also to provide for the reversal of the driven shaft at different speeds.

Another object of the invention is to provide a simple and efficient mechanism of the kind stated, the parts being so constructed and arranged, that they can be readily set by one attendant to change the speed, or to reverse the driven shaft.

The invention is designed more particularly for use in connection with traction engines, well-drilling machinery, motor vehicles, and any other machinery driven by an internal-combustion engine or other motor running at a uniform speed in one direction, and requiring a reverse and changeable speed transmission mechanism, and the same consists in the novel construction and arrangement of the parts to be hereinafter described and claimed, reference being had to the drawings hereto annexed, in which the preferred embodiment of the invention is shown, it being understood that various changes in the form, proportion, size and minor details of the structure may be resorted to without departing from the spirit, or sacrificing any of the advantages of the invention.

In the drawings,—Figure 1 is a plan view of the mechanism, partly in section, showing one set of gears in mesh. Fig. 2 is a similar view showing the other set of gears in mesh.

Referring more particularly to the drawings, 5 denotes the drive, and 6 the driven shaft, these shafts being arranged at a right angle relatively to each other. The drive shaft is supported in a bearing 7, and power is applied to said shaft through a suitable clutch mechanism 8. The driven shaft is supported in bearings 9 mounted on a portion 10 of the frame of the machine to which the invention is applied.

On the drive shaft 5 is mounted a pair of bevel pinions, indicated at 11 and 12 respectively. These pinions are adapted to be engaged with bevel gear teeth on a pair of disks mounted on the driven shaft as will be presently described. The pinion 11 is keyed or otherwise made fast on the shaft 5, and the pinion 12 is slidable lengthwise thereon, and secured by a feather 13 so that it will also rotate with the shaft. The hub of the pinion 12 has a circumferential groove in which fits a split bearing 14 carried by a yoke 15 fulcrumed at one end, as indicated at 16, on one of the frame members 10, and having connected to its opposite end a link 17, connected to a suitable operating lever (not shown) whereby the pinion may be shifted lengthwise on the drive shaft.

On the driven shaft 6 are mounted, so as to slide lengthwise thereon, and to rotate therewith, disks 18 and 19, having on their opposite faces sets 20 and 21, respectively, of bevel gear teeth, the former being adapted to engage the pinion 11, and the latter the pinion 12. The gear teeth 20 and 21 have different pitch diameters, so that they will transmit different speeds. The disks 18 and 19 have hubs 22 formed with circumferential grooves in which fit split bearings 23 carried by yokes 24 fulcrumed at one end, as indicated at 25, to a transverse portion 26 of the frame. The yokes are connected at their opposite ends by a link 27 provided with a turn-buckle 28 for the purpose of taking up wear. On one of the frame members 10 is mounted a bearing 29 in which is journaled a rock shaft 30 having a rocker arm 31 which is connected by a link 32 to the free end of one of the yokes 24. The rock shaft is provided with a suitable hand lever (not shown) for operating the same, and upon rocking said shaft, the two yokes are swung on their fulcrums, and the disks 18 and 19 are thereby shifted lengthwise on the driven shaft 6. The link 32 is connected to the rocker arm 31 by a coupling head 33, into which it is screwed, so that wear may be taken up.

The operation is as follows:—To throw the pinion 12 and the teeth 21 into gear, the disks 18 and 19 are shifted on the shaft 6 in a direction according to the direction in which the motion is to be transmitted, so that when the pinion is moved forwardly, it will come into mesh with said teeth of the desired disk, as shown in Fig. 1. The pitch diameter of the pinion 12 is greater than that of the pinion 11, and the teeth 20 are set inwardly from the teeth 21 so that when the pinion 12 is brought in mesh with the teeth 21, the pinion 11 and the teeth 20 separate. To throw the pinion 11 and the teeth 20 in gear, the pinion 12 is withdrawn, and the disks 18 and 19 are shifted on the shaft 6, to bring the teeth 20 of the desired disk in mesh with said pinion as shown in Fig. 2. In both positions herein described, the teeth of the disk 18 are shown in mesh. To reverse the motion the disks are shifted so as to bring the teeth of the disk 19 in mesh with the pinions.

The mechanism herein described, by reason of its simplicity of construction, is easy to operate, and is reliable in action. The operating means are so arranged that they can be easily handled by a single attendant.

What is claimed is:—

1. In a transmission mechanism, a drive and a driven shaft, a fixed and a slidable bevel pinion on the drive shaft, a pair of disks slidable on the driven shaft and rotatable therewith, said disks having sets of bevel gear teeth of different pitch diameters on their opposite faces, and means for alternately bringing the slidable pinion in mesh with one set of gear teeth of either disk, and the fixed pinion with the other set of either disk.

2. In a transmission mechanism, a drive and a driven shaft, a fixed and a slidable bevel pinion on the drive shaft, a pair of disks slidable on the driven shaft and rotatable therewith, said disks having sets of bevel gear teeth of different pitch diameters on their opposite faces, and the teeth of the smaller diameter being located inwardly from the teeth of the larger diameter, and means for alternately bringing the slidable pinion in mesh with one set of teeth of either disk, and the fixed pinion with the other set of either disk.

3. In a transmission mechanism, a drive and a driven shaft, a fixed and a slidable bevel pinion on the drive shaft, said pinions having different pitch diameters, a pair of disks slidable on the driven shaft and rotatable therewith, said disks having sets of bevel gear teeth of different pitch diameters on their opposite faces, and the teeth of the smaller diameter being located inwardly from the teeth of the larger diameter, and means for alternately bringing the slidable pinion in mesh with the set of teeth of larger diameter of either disk, and the fixed pinion with the other set of either disk.

In testimony that I claim the foregoing as my own, I have hereto affixed my signature in the presence of two witnesses.

WILLIAM C. JAMESON.

Witnesses:
  Jos. C. Rouzer,
  J. G. Sakraida.